(12) United States Patent
Nafissi

(10) Patent No.: US 12,194,380 B1
(45) Date of Patent: Jan. 14, 2025

(54) ADAPTABLE COMPETITIVE SPORTS VIDEO GAMING SYSTEM AND PROCESSES

(71) Applicant: Fraydoon Nafissi, Plano, TX (US)

(72) Inventor: Fraydoon Nafissi, Plano, TX (US)

(*) Notice: Subject to any disclaimer, the term of this patent is extended or adjusted under 35 U.S.C. 154(b) by 0 days.

(21) Appl. No.: 18/620,700

(22) Filed: Mar. 28, 2024

Related U.S. Application Data

(60) Provisional application No. 63/534,691, filed on Aug. 25, 2023.

(51) Int. Cl.
  *A63F 13/45* (2014.01)
  *A63F 13/812* (2014.01)

(52) U.S. Cl.
  CPC ............ *A63F 13/45* (2014.09); *A63F 13/812* (2014.09)

(58) Field of Classification Search
  CPC .......... A63F 13/25; A63F 13/45; A63F 13/46; A63F 13/70; A63F 13/812; A63F 2300/61
  See application file for complete search history.

(56) References Cited

U.S. PATENT DOCUMENTS

| | | | |
|---|---|---|---|
| 2018/0345149 A1* | 12/2018 | Farudi | A63F 13/798 |
| 2019/0114485 A1* | 4/2019 | Chan | H04N 21/4662 |
| 2021/0089779 A1* | 3/2021 | Chan | H04N 21/472 |
| 2021/0092466 A1* | 3/2021 | Suzuki | A63F 13/25 |
| 2021/0397846 A1* | 12/2021 | Chang | H04N 21/4662 |

* cited by examiner

*Primary Examiner* — Omkar A Deodhar
(74) *Attorney, Agent, or Firm* — Plager Schack LLP; Mark H. Plager, Esq.; Stephen Hallberg, Esq.

(57) ABSTRACT

An adaptable competitive sports video gaming system and processes are disclosed with revamped scoring, red card, substitution and time-management rules of soccer, and offering several different scoring scenarios. The system provides a platform to reforge rules and scoring scenarios of a traditional competitive sports video game and offer a variation to users of video games. The system includes (i) a game play framework that implements game play rules, competitive play components, and a competitive play area of a reforged adaptable sport video game, (ii) an alternate game play rules manager, (iii) an event framework, (iv) a game play rules engine, and (v) a game play and scoring engine. The system also has multiple databases to store game play rules, alternate rules, scoring scenarios, play components, etc., of the reforged adaptable sport video game.

13 Claims, 5 Drawing Sheets

ADAPTABLE COMPETITIVE SPORTS VIDEO GAMING SYSTEM AND PROCESSES

CLAIM OF BENEFIT TO PRIOR APPLICATION

This application claims benefit to U.S. Provisional Patent Application 63/534,691, entitled "Revamping scoring, red card, substitution and time-management rules of soccer for new soccer video game," filed Aug. 25, 2023. The U.S. Provisional Patent Application 63/534,691 is incorporated herein by reference.

BACKGROUND

Embodiments of the invention described in this specification relate generally to adaptable competitive sports video gaming systems and processes, and more particularly, to an adaptable soccer video gaming system and processes for customizing scoring, red card, substitution, and time-management soccer rules for software-implemented video game.

Present soccer scoring rules and scoring scenarios used in soccer video games are not as exciting as they can and should be. The conventional existing soccer video games implement standard rules and game play with standard scoring, as one would expect in actual, live soccer competitions. However, this is a little boring after a while. Consequently, none of the existing soccer video games are very exciting for the young generation of users.

Therefore, what is needed is a way to provide a virtual competitive sports gaming environment that can be adapted to provide different scoring scenarios and different rules, as well as allowing for game play and playing field features to be tailored to fit the rules and scoring scenarios or otherwise for players to enjoy variations in the virtual gaming environment.

BRIEF DESCRIPTION

A novel adaptable competitive sports video gaming system and processes are disclosed. The adaptable competitive sports video gaming system provides a platform to reforge rules and scoring scenarios of a traditional competitive sports video game and offer a variation to users of video games. In some embodiments, the adaptable competitive sports video gaming system comprises (i) a game play framework that implements game play rules, competitive play components, and a competitive play area of a reforged adaptable sport video game, (ii) an alternate game play rules manager configured to receive, process, and store alternate game play rules to apply during game play to the reforged adaptable sport video game, and then provide the alternate game play rules to the game play framework for implementation as the game play rules, (iii) an event framework configured to detect and trigger game play events during game play for an instance of the reforged adaptable sport video game according to the implemented game play rules, (iv) a game play rules engine configured to detect and process, in realtime during game play, game play events triggered by the event framework in accordance with the implemented game play rules (either the reforged game play rules or alternate game play rules), and (v) a game play and scoring engine configured to constrain game play for the reforged adaptable sport video game according to the implemented game play rules, competitive play components, and the competitive play area implemented by the game play framework. In some embodiments, the adaptable competitive sports video gaming system comprises a reforged game play rules and scoring database that stores the game play rules, the competitive play components, and the competitive play area of the reforged adaptable sport video game. In some embodiments, the adaptable competitive sports video gaming system comprises an alternate game play rules database configured to store user-configured game rules comprising one or more of alternate game play rules, alternate competitive play components, and alternate settings for the competitive play area of the reforged adaptable sport video game. In some embodiments, the adaptable competitive sports video gaming system comprises an alternate scoring scenarios database configured to store alternate scoring scenarios to apply during game play of the reforged adaptable sport video game. In some embodiments, the alternate scoring scenarios correspond to the user-configured game rules and are applied together during game play of the reforged adaptable sport video game. In some embodiments, the adaptable competitive sports video gaming system further comprises a user rules and scoring configuration interface that a user of the reforged adaptable sport video game interacts with to provide alternate game play rules and scoring scenarios.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
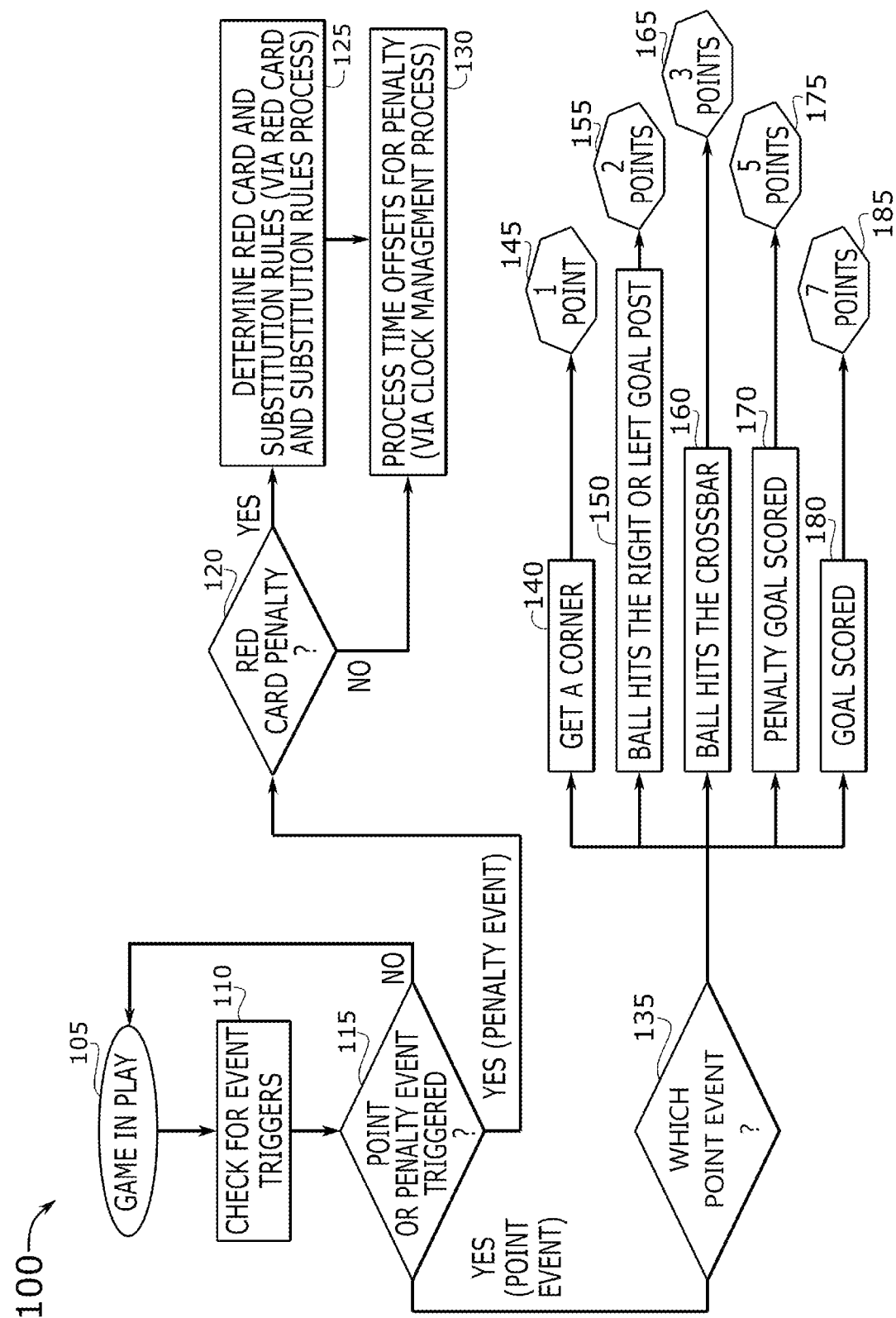
FIG. 1 conceptually illustrates an event trigger process for detecting point and penalty events in an adaptable soccer video gaming system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification include an adaptable competitive sports video gaming system and processes which provide a platform to reforge rules and scoring scenarios of a traditional competitive sports video game (which, as adapted, is referred to as the "reforged adaptable sport video game" and in a specific implementation as the "adaptable soccer video game"). In some embodiments, the adaptable competitive sports video gaming system comprises (i) a game play framework that implements game play rules, competitive play components, and a competitive play area of a reforged adaptable sport video game, (ii) an alternate game play rules manager configured to receive, process, and store alternate game play rules to apply during game play to the reforged adaptable sport video game, and then provide the alternate game play rules to the game play framework for implementation as the game play rules (which modifies the reforged adaptable sport video game according to the alternate game play rules), (iii) an event framework configured to detect game play events during game play and trigger one or more event processing unit to enact one or more game event rules according to the game play rules (or alternate game play rules), while an instance of the reforged adaptable sport video game is active (executing) and users are interacting with the reforged adaptable sport video game to engage in game play, (iv) a rules engine configured to detect and process, in realtime during game play, game play events triggered by the event framework in accordance with the game play rules (or alternate game play rules) of the reforged adaptable sport video game implemented by the game play framework, and (v) a game play and scoring engine configured to constrain game play for the reforged adaptable sport video game according to the game play rules, competitive play components, and the competitive play area implemented by the game play framework. In some embodiments, the adaptable competitive sports video gaming system comprises a reforged game play rules and scoring database that stores the game play rules, the competitive play components, and the competitive play area of the reforged adaptable sport video game. In some embodiments, the adaptable competitive sports video gaming system comprises an alternate game play rules database configured to store user-configured game rules comprising one or more alternate game play rules, alternate competitive play components, and alternate settings for the competitive play area of the reforged adaptable sport video game. In some embodiments, the adaptable competitive sports video gaming system comprises an alternate scoring scenarios database configured to store alternate scoring scenarios to apply during game play of the reforged adaptable sport video game. In some embodiments, the alternate scoring scenarios correspond to the user-configured game rules and are applied together during game play of the reforged adaptable sport video game. In some embodiments, the adaptable competitive sports video gaming system further comprises a user rules and scoring configuration interface that a user of the reforged adaptable sport video game interacts with to provide alternate game play rules and scoring scenarios.

In some embodiments, the adaptable competitive sports video gaming system is configured to use a default set of modified game play rules. In some embodiments, the default set of modified game play rules are automatically loaded upon starting game play. In some embodiments, the default set of modified game play rules are loaded in the rules engine of the adaptable competitive sports video gaming system.

In some embodiments, the adaptable competitive sports video gaming system is configured to change the default set of modified game play rules to a set of custom game play rules. In some embodiments, the custom game play rules comprise user-specified game play rules that are input by a user of the adaptable competitive sports video gaming system. In some embodiments, the custom game play rules comprise a particular set of alternate game play rules selected from a plurality of sets of alternate game play rules. In some embodiments, the particular set of alternate game play rules is selected by a user action to load the particular set of alternate game play rules. In some embodiments, the user action comprises selecting the particular set of alternate game play rules on a screen. In some embodiments, the user action comprises scanning a QR code to load the particular set of alternate game play rules.

In some embodiments, the adaptable competitive sports video gaming system is configured to use a default competitive play area when the default set of modified game play rules is used. In some embodiments, the adaptable competitive sports video gaming system is configured to adjust the default competitive play area to a custom competitive play area. In some embodiments, the adaptable competitive sports video gaming system is configured to automatically adjust the default competitive play area to a custom competitive play area when the default set of modified game play rules is changed. In some embodiments, the adaptable competitive sports video gaming system is configured to adjust the default competitive play area to a user-specified competitive play area when a user changes the default competitive play area.

In some embodiments, the adaptable competitive sports video gaming system is configured to use a default set of competitive play components when the default set of modified game play rules is used. In some embodiments, the adaptable competitive sports video gaming system is configured to automatically adjust the default set of competitive play components to a custom set of competitive play components when the default set of modified game play rules is changed. In some embodiments, the adaptable competitive sports video gaming system is configured to adjust a particular competitive play component in the default set of competitive play components to a user-specified competitive play component when a user changes the particular competitive play component.

In a preferred embodiment, the adaptable competitive sports video gaming system and processes comprise an adaptable soccer video gaming system and processes for customizing scoring, red card, substitution, and time-management soccer rules for software-implemented video game. In some embodiments, the adaptable soccer video gaming system comprises a (i) soccer game play framework that implements modified soccer game play rules, competitive soccer play components, and a competitive soccer play area (upon starting game play), (ii) an alternate game play rules manager configured to receive alternate game play rules that are different from the modified soccer game play rules and adapt the soccer game play framework in support of the alternate game play rules, (iii) a soccer rules engine configured to process, in realtime during game play, soccer game play events in accordance with the modified soccer game play rules or alternate game play rules implemented in the soccer game play framework, and (iv) an adapted soccer game play and scoring engine configured to constrain game play according to the modified soccer game play rules or the alternate game play rules set in the soccer game play framework.

In some embodiments, the adaptable competitive sports video gaming system is configured to use a default set of modified soccer game play rules. In some embodiments, the default set of modified soccer game play rules are automatically loaded upon starting game play. In some embodiments, the default set of modified soccer game play rules are loaded in the soccer rules engine of the adaptable competitive sports video gaming system.

In some embodiments, the adaptable competitive sports video gaming system is configured to change the default set of modified soccer game play rules to a set of custom soccer game play rules. In some embodiments, the custom soccer game play rules comprise user-specified soccer game play rules that are input by a user of the adaptable competitive sports video gaming system. In some embodiments, the custom soccer game play rules comprise a particular set of alternate soccer game play rules selected from a plurality of sets of alternate soccer game play rules. In some embodiments, the particular set of alternate soccer game play rules is selected by a user action to load the particular set of alternate soccer game play rules. In some embodiments, the user action comprises selecting the particular set of alternate soccer game play rules on a screen. In some embodiments, the user action comprises scanning a QR code to load the particular set of alternate soccer game play rules.

In this specification, the term "competitive play area" refers to the area in which the sport is played, such as a field of play (soccer field, baseball field, football field, rugby field, lacrosse field, etc.), a court (basketball, tennis, volleyball, badminton, etc.), a rink (ice hockey, speed (ice) skating, roller derby and roller skating, etc.), a pitch (cricket, soccer, rugby, field hockey, etc.), etc. Additionally, "game play rules" refers to the rules for competition game play including scoring rules, game play rules and infractions of the game play rules, player substitution rules, timing rules, etc. Also, "game play components" refers to the items arranged in and around the competitive play area for competition game play to ensue (e.g., soccer goal, lines of the competitive play area, etc.). Similarly, "scoring scenarios" refers to scoring events that are tallied for the game.

Embodiments of the adaptable competitive sports video gaming system and processes described in this specification solve the problems, as noted above, of the existing soccer and other sports gaming systems by providing a fully user-configurable game environment with new scoring scenarios and new and adaptable rules, thereby making this adapted soccer video game more exciting than conventional offerings. For example, the adaptable competitive sports video gaming system may provide a scoring scenario that is not limited to only one point per goal (as in soccer), but instead is expanded to include possible point values of one, two, three, five, seven, nine, and ten points for different types of scoring events, and adaptable so as to allow for even more points.

Embodiments of the adaptable competitive sports video gaming system and processes described in this specification differ from and improve upon currently existing options. In particular, established rules in sports/games, such as soccer, were established long ago and do not provide creative excitement as they may have in the past. In particular, the rules of soccer are from over a hundred years ago and do not come close to matching a new level of excitement young players/users (in today's young generation) need and even expect to get engaged in a video game. This is addressed by the adaptable competitive sports video gaming system, which provides many more opportunities for scoring points, less chances of games ending in draws, and penalty shoot outs determining the fate of the game. Furthermore, the adaptable competitive sports video gaming system is fully configurable by users to create their own rules, their own scoring scenarios, etc. The adaptable competitive sports video gaming system adapts the gaming visual environment to suit the new rules and scoring scenarios. In this way, the adaptable competitive sports video gaming system provides users with more opportunities for scoring points in new ways that spur excitement and add elements of surprise or complexity, thereby effectively engaging users in the gaming experience.

The adaptable competitive sports video gaming system and processes of the present disclosure may be comprised of the following elements. This list of possible constituent elements is intended to be exemplary only and it is not intended that this list be used to limit the adaptable competitive sports video gaming system and processes of the present application to just these elements. Persons having ordinary skill in the art relevant to the present disclosure may understand there to be equivalent elements that may be substituted within the present disclosure without changing the essential function or operation of the adaptable competitive sports video gaming system and processes.

1. A game play framework that implements game play rules, competitive play components, and a competitive play area (upon starting game play). The game play rules include at least game play scoring rules, penalty and substitution rules, and game play time and clock management rules.

2. An alternate game play rules manager configured to receive alternate game play rules and adapt the game play framework in support of the alternate game play rules. When alternate game play rules are received (e.g., by a user inputting new scoring scenarios, new penalty and substitution rules, and/or new game play time and clock management rules), the game play rules are updated to reflect either new scoring scenarios for the game play scoring rules, new penalty and substitution rules (e.g., new red card and substitution rules for adapted soccer), and/or different game play time and clock management rules.

3. An event framework configured to detect game play events while a game is in play for the reforged adaptable sport video game and trigger one or more event processing unit to enact one or more game event rules according to the game play rules applied by the game play framework and/or the alternate game play rules manager, when alternate game play rules result in updated game play rules for the game in play (the game play rules and/or the alternate game play rules are referred to as the runtime game play rules during a game in play). The game play event framework comprises a plurality of even processing units. In some embodiments, the plurality of event processing units comprises a penalty event processing unit, a point event processing unit, and a time and clock event manager.

4. A game play rules engine configured to detect and process, in realtime during game play, game play events triggered by the event framework in accordance with the runtime game play rules during the game in play (as set by the game play framework or alternate game play rules manager).

5. A game play and scoring engine configured to constrain game play according to the runtime game play rules (penalty and scoring scenarios), competitive play components, and the competitive play area (upon starting game play) as set in the game play framework or as adapted by user configuration via the alternate game play rules manager. During the game in play, the game play and scoring engine is also configured to tally game play scoring for all competing users/teams.

A detailed example of an adaptable competitive sports video gaming system is described further below, by reference to FIG. 4.

In at least one embodiment, new scoring rules are implemented to replace existing scoring rules when building the reforged adaptable sport video game with a version of an adaptable soccer video game. In this embodiment, the new scoring rules implemented in the reforged adaptable sport video game with the adaptable soccer video game provide (i) one point for getting a corner, (ii) two points for a ball hitting a goalpost, (iii) three points for a ball hitting a crossbar including its two end joints with both goalposts, (iv) five points for a goal scored by a penalty kick, and (v) seven points for scoring a goal. Furthermore, the top three scoring scenarios may and could happen in any possible combination. Additionally, a goal scored by a penalty kick may be configured in the reforged adaptable sport video game/ adaptable soccer video game to provide a possible higher score, such as seven points, eight points, nine points, ten points, twelve points, and maybe even more points.

By way of example, FIG. 1 conceptually illustrates an event trigger process for detecting point and penalty events in an adaptable soccer video game implementation of the reforged adaptable sport video game 100. The event trigger process for detecting point and penalty events in the adaptable soccer video game implementation of the reforged adaptable sport video game 100 is performed by the event framework (including one or more event processing units of the event framework), the game play and scoring engine, and the game play rules engine of the adaptable competitive sports video gaming system.

In some embodiments, the event trigger process for detecting point and penalty events in the reforged adaptable sport video game 100 starts when an instance of the adaptable soccer video game implementation of the reforged adaptable sport video game is launched and is running on an electronic system, such as an electronic video game system, a computing device, a mobile device, etc. For example, a user interacting with the adaptable competitive sports video game system starts a new instance, or loads a saved instance, of the adaptable soccer video game. When the adaptable soccer video game starts, the game is considered in play ("game in play" at 105). Generally, the game in play (at 105) continues until an end of the game is reached or the user shuts down the game in play earlier than the end of the game. The end of the game is reached based on the time and clock management rules of the adaptable competitive sports video game system (either default adapted time management rules or user-specified altered time management rules). An example of the end of the game for adapted time and clock management is described below, by referenced to FIG. 3.

While the user (and either one or more other human user(s) or an automated user of the adaptable soccer video game) continues interacting with the adaptable soccer video game while the game is in play (at 105), the event trigger process for detecting point and penalty events in the adaptable soccer video game implementation of the reforged adaptable sport video game 100 periodically checks for event triggers (at 110). When checking for event triggers (at 110), the event trigger process for detecting point and penalty events in the adaptable soccer video game implementation of the reforged adaptable sport video game 100 determines (at 115) whether a point or penalty event has been triggered. As noted above, point and penalty events are triggered by the event framework while the game is in play and according to the game play rules applied by the game play framework and/or the alternate game play rules manager. When the event trigger process for detecting point and penalty events in the adaptable soccer video game implementation of the reforged adaptable sport video game 100 determines (at 115) that no event has been triggered, the event trigger process for detecting point and penalty events in the adaptable soccer video game implementation of the reforged adaptable sport video game 100 returns to the game in play (at 105) and continues forward, as described above.

However, when the event trigger process for detecting point and penalty events in the adaptable soccer video game implementation of the reforged adaptable sport video game 100 affirmatively determines (at 115) that an event has been triggered ('YES'), the process for detecting point and penalty events in the adaptable soccer video game implementation of the reforged adaptable sport video game 100 determines the type of event that was triggered, namely, a point event or a penalty event. When the triggered event is determined (at 115) to be a point event, the event trigger process for detecting point and penalty events in the adaptable soccer video game implementation of the reforged adaptable sport video game 100 continues forward to a sequence of steps for determining (at 135) which type of point event was triggered. The determination (at 135) of which type of point event was triggered is described in further detail below.

Turning back to the determination (at 115), when the event trigger process for detecting point and penalty events in the adaptable soccer video game implementation of the reforged adaptable sport video game 100 affirmatively determines that the type of event that was triggered was a penalty event, then the event trigger process for detecting point and penalty events in the adaptable soccer video game implementation of the reforged adaptable sport video game 100 transitions to a separate sequences of steps for determining (at 120) whether the penalty event is a red card penalty or not.

When the penalty event is not a red card event ('NO'), the event trigger process for detecting point and penalty events in the adaptable soccer video game implementation of the reforged adaptable sport video game 100 proceeds to a step for processing time offsets for the penalty (at 130). Processing time offsets for the penalty (at 130) is described in further detail below, by reference to FIG. 3. Turning back to the determination (at 120), when the penalty affirmatively determined (at 120) to be a red card penalty ('YES'), the event trigger process for detecting point and penalty events in the adaptable soccer video game implementation of the reforged adaptable sport video game 100 transitions to a step for determining red card and substitution rules (at 125) by way of a red card and substitution rules process, which is described in greater detail below, by reference to FIG. 2. After determining the red card and substitution rules (at 125), the event trigger process for detecting point and penalty events in the adaptable soccer video game implementation of the reforged adaptable sport video game 100 proceeds to the step for processing time offsets for the penalty (at 130).

Now, turning back to the sequence of steps for determining (at 135) which type of point event was triggered, the event trigger process for detecting point and penalty events in the adaptable soccer video game implementation of the reforged adaptable sport video game 100 identifies a particular point event among a plurality of different point scenarios. Furthermore, the plurality of different point scenarios each correspond to a particular point value. The plurality of different point scenarios shown in FIG. 1 include a get a corner point event (at 140) that corresponds with a one point value (at 145), a ball hits the right or left goal post point event (at 150) that corresponds with a two point value (at 155), a ball hits the crossbar point event (at 160) that corresponds with a three point value (at 165), a penalty goal scored point event (at 170) that corresponds with a five point value (at 175), and a goal scored point event (at 180) that corresponds with a seven point value (at 185). Note that the point event for when the ball hits the crossbar includes the ball hitting either joint of the crossbar at which the right and left goal posts connect (at 160), and when hitting either joint corresponds with the three point value (at 165). In this way, the event trigger process for detecting point and penalty events in the adaptable soccer video game implementation of the reforged adaptable sport video game 100 is able to provide the particular point value corresponding to the identified point event type to the game play and scoring engine for game play score tracking (or tallying).

Figure 2:
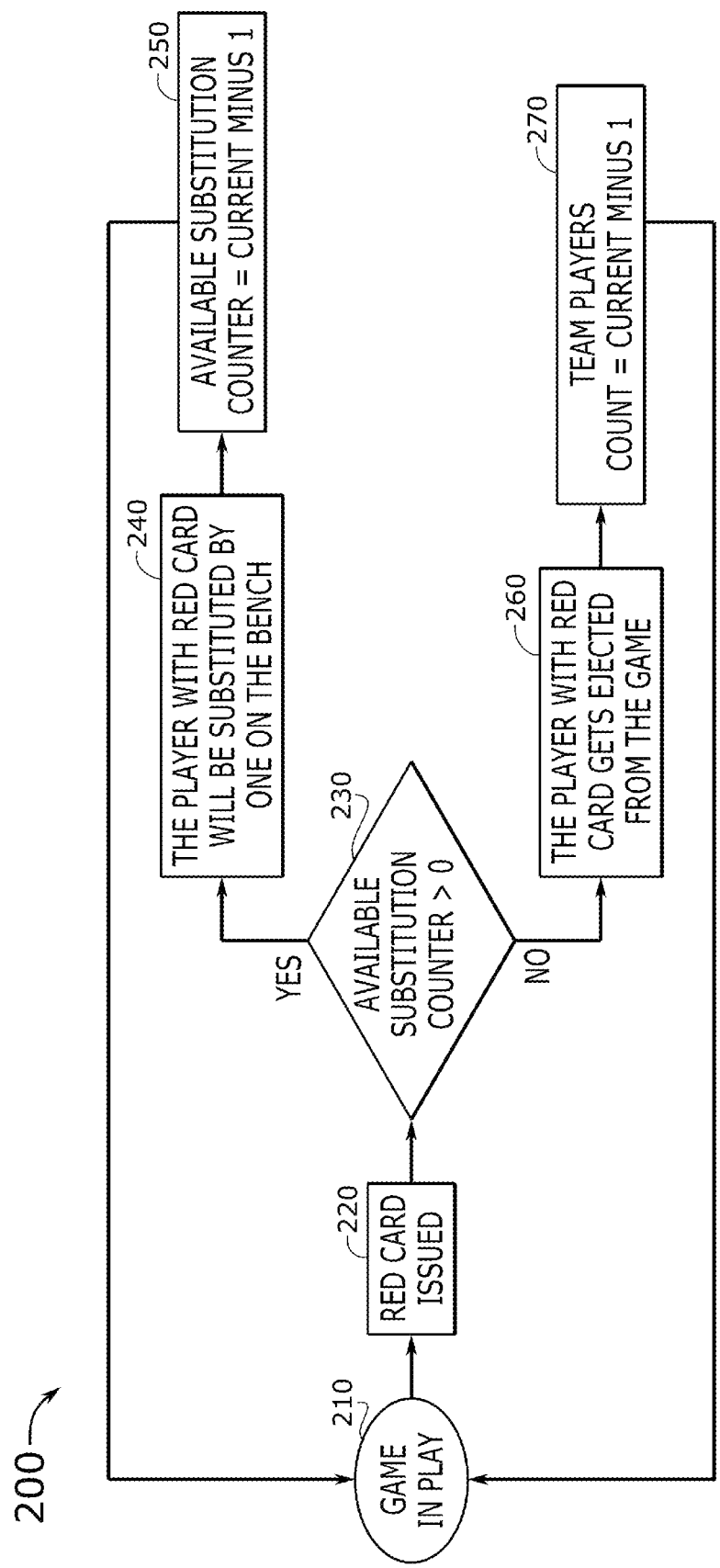
FIG. 2 conceptually illustrates a process for applying adapted red card and substitution rules in an adaptable soccer video gaming system in some embodiments.

Turning to another example, FIG. 2 conceptually illustrates a process for applying adapted red card and substitution rules (the "red card and substitution rules process") 200 in the adaptable soccer video game implementation of the reforged adaptable sport video game running in connection with the adaptable soccer video gaming system. As shown in this figure, the red card and substitution rules process 200 is started when the game is already in play. Specifically, the red card and substitution rules process 200 is performed to determine red card and substitution rules (at 125), described above by reference to FIG. 1. Note, however, that the adaptable soccer video game implementation of the reforged adaptable sport video game is being played currently, so the time during the game may be near the start or in the middle or near the end of the game. Thus, any of the prior events for scoring scenarios, described above by reference to FIG. 1, may have already occurred. Nevertheless, in this case, the step for checking for event triggers (at 110) would have determined (at 115) that a penalty event affirmatively happened and that is also determined (at 120) to be a red card penalty, in order to determine the red card and substitution rules (at 125).

This is shown in the red card and substitution rules process 200 of FIG. 2 by a step at which the red card is issued (at 220). Upon the red card being issued, the red card and substitution rules process 200 of some embodiments determine (at 230) whether an available substitution counter value is greater than zero or not. When the available substitution counter value is affirmatively greater than zero ('YES'), the red card and substitution rules process 200 proceeds to a step at which the player with the red card will be substituted by another player on the bench (at 240). Then the red card and substitution rules process 200 automatically performs a step to decrement the available substitution counter by one (at 250). Specifically, to decrement the available substitution counter by one (at 250), the red card and substitution rules process 200 reads a current value of the available substitution counter and subtracts one from the current value. After decrementing the available substitution counter by one (at 250), the red card and substitution rules process 200 of some embodiments returns to the game in play (at 210).

Turning back to the determination (at 230), when the available substitution counter value is not greater than zero ('NO'), the red card and substitution rules process 200 of some embodiments transition to a step at which the player with the red card gets ejected from the game (at 260) and is not allowed to return during the game in play (at 210). Accordingly, the red card and substitution rules process 200 decrements a team players count value by one (at 270) to account for the loss of the ejected player during the game in play (at 210). Of course, all players may participate in future games, even if/when ejected from a prior game. Either way, after ejected the player with the red card (at 260) and decrementing the team players count value by one (at 270), the red card and substitution rules process 200 returns to the step at which the game is in play (at 210), which continues until a break or an end of game point, as determined by clock management during the game. An example of a clock management process is described next, by reference to FIG. 3.

Figure 3:
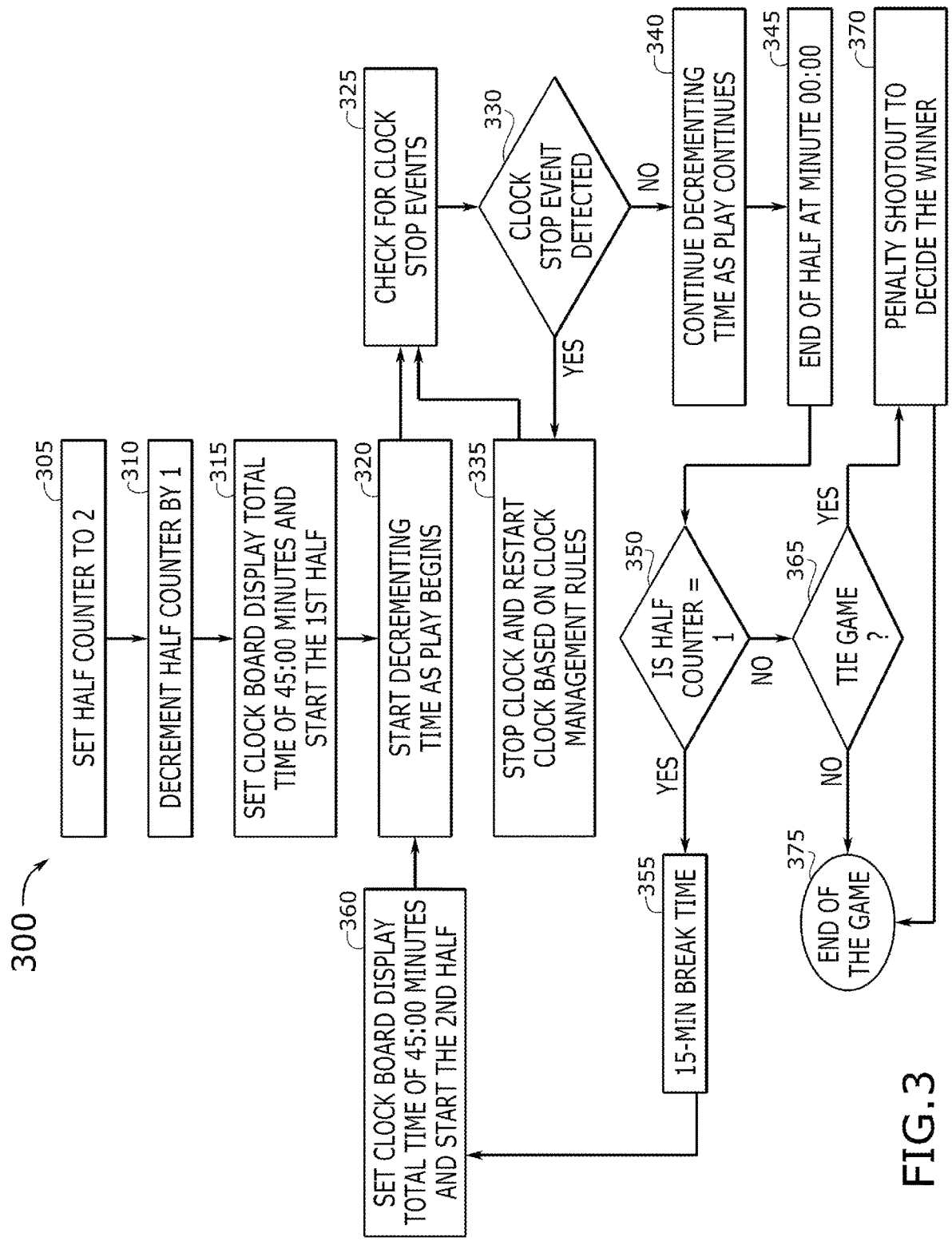
FIG. 3 conceptually illustrates an adapted clock management process for performing clock management in an adaptable soccer video gaming system in some embodiments.

Specifically, FIG. 3 conceptually illustrates an adapted clock management process (the "clock management process") 300 for performing clock management in the adaptable soccer video game implementation of the reforged adaptable sport video game running in connection with the adaptable soccer video gaming system. As shown in this figure, the clock management process 300 starts by setting a half counter value to two (at 305). This is followed by a step at which the clock management process 300 decrements the half counter value by one (at 310). Then the clock management process 300 sets a total time on a clock board display in the adaptable soccer video game implementation of the reforged adaptable sport video game to a total time of forty-five minutes ("45:00") and starts the first half of the adaptable soccer video game (at 315).

The moment the first half of the adaptable soccer video game starts, the clock management process 300 starts decrementing time for every elapsed second (at 320). After starting the "countdown" of the clock (e.g., 45:00, 44:59, 44:58, . . . ), the clock management process 300 immediately checks for clock stop events (at 325). This step for checking for clock stop events (at 325) is critical and occurs with such regularity and automatically, that it seems continuous. Note, however, that there are other steps after checking for clock stop events (at 325) which do take some time to complete before the clock management process 300 can return to the step for check for clock stop events (at 325) again. In particular, the clock management process 300 performs a step for determining (at 330) whether a clock stop event is detected during the step for checking for clock stops (at 325). When a clock stop event is detected ('YES'), the clock management process 300 stops the clock (at 335) and then restarts the clock (after some time) based on the clock management rules incorporated into the adapted rules for the adaptable soccer video game. For example, a red card is issued, which may be a clock-stopping event under the adapted rules for the adaptable soccer video game (or not, depending on user configuration and setting of the adapted rules). After restarting the clock based on the clock management rules (at 335), the clock management process 300 returns to the step for checking for clock stop events (at 325).

The determination (at 330) processing cycle is different when no clock stop event is detected ('NO'), in which case the clock management process 300 continues decrementing the time (second by second) as game play continues (at 340). It could even be the case that there is no clock stop event detected during the entire half. For example, the countdown of the clock may decrement the clock second by second until the end of the first half (e.g., 45:00, 44:59, 44:58, . . . , 42:01, . . . , 00:22, . . . , 00:02, 00:01, 00:00). Then the clock management process 300 marks the end of the half (at 345) at the point the clock reaches 00:00.

In some embodiments, the clock management process 300 then proceeds to a step to determine (at 350) whether the half counter value is equal to one, which would indicate the end of the first half. When, for example, the half counter value is equal to two, then the end of the second half is reached and, presumably, the game is over, unless the adapted rules provide for overtime when tied in score and/or provide additional periods of game play. In any event, when the half counter value is affirmatively determined to be equal to one ('YES'), then the end of the first half is reached and the clock management process 300 proceeds to a step for taking a half-time break (at 355). In some rule and clock management settings, the half-time break is set to fifteen minutes. In some other rule and clock management settings, the half-time break is set to a different duration of time. During the half-time break, game play is on hold.

As the half-time break expires, the clock management process 300 proceeds to a step for setting the clock board display total time to 45:00 for the start of the second half (at 360). Then the clock management process 300 proceeds to the step for decrementing the time as play begins (at 320), in this case, during the second half. This cycle continues as described above.

Turning back to the determination (at 350) of whether the half counter value is equal to one or not, when the half counter value is not equal to one, then the clock management process 300 proceeds to a different step for determining (at 365) whether the game is tied or not. This step is performed to understand whether there needs to be tie-breaking rules loaded and processed for determining a winner. When the game is not tied at the end of the second half ('NO'), the clock management process 300 ends the adaptable soccer video game and the winner is declared based on the score. However, when the game is affirmatively tied at the end of the second half ('YES'), the clock management process 300 proceeds to a penalty shootout to decide the winner of the game (at 370). Then the clock management process 300 ends and the adaptable soccer video game and the winner is declared based on the winner of the penalty shootout (at 370).

To make the adaptable competitive sports video gaming system and processes of the present disclosure, a person would design, develop, and code the software for the reforged adaptable sport video game. For instance, the reforged adaptable sport video game can be implemented to provide an adaptable soccer video game with adapted soccer penalty, red card, and substitution rules as well as adapted scoring scenarios, such as the adapted scoring scenarios described above, by reference to FIG. 1). An emphasis on implementing adapted soccer rules (for an adaptable soccer video game version of the reforged adaptable sport video game) and a visual, interactive game play interface in which game play proceeds under the adapted soccer rules is expected. However, ensuring that the reforged adaptable sport video game can offer user-configuration options may also be a key design aspect for making the reforged adaptable sport video game. When the reforged adaptable sport video game is hosted in the cloud, the deployment of the adaptable competitive sports video gaming system would likely include deployment of hardware computing resources that support a cloud application service, to which user may connect over the internet to participate in game play with other users engaged in the reforged adaptable sport video game. To this extent, the person would also plan to make and provide interactive user tools for customizing the rules, scoring, and game play flow of the reforged adaptable sport video game. On the other hand, the reforged adaptable sport video game need not be designed to run in connection with a cloud application service but, instead (or in conjunction with), may be developed and deployed for players to install and interact with on an individual gaming system (such as Xbox® by Microsoft, Play Station® by Sony, mobile app version with mobile cloud application service, or PC game for individual computers whether connected in a cloud-based network environment or not). Such players could utilize the reforged adaptable sport video game with the adapted rules and scoring scenarios (or, when the reforged adaptable sport video game is configured to provide an adaptable soccer video game, utilizing the adapted soccer scoring, red card, substitution, and other rules out of the box, for example, the adapted soccer rules described above, by reference to FIGS. 1-3), or could create new rules which would be processed by the rules engine to generate a game play environment and event framework compliant with the user's new rules. This will open up new and creative avenues for game play by a generation of soccer video game enthusiasts.

Figure 4:
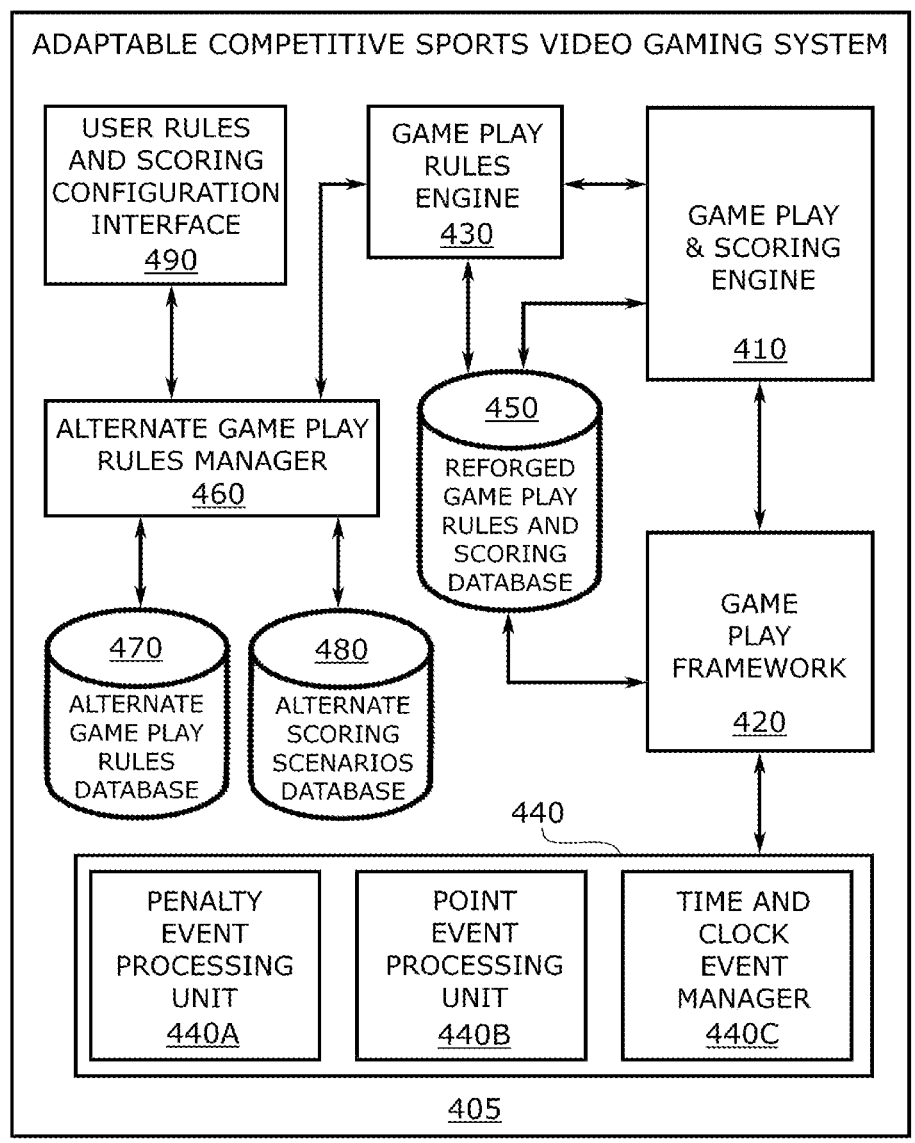
FIG. 4 conceptually illustrates a block diagram of an adaptable competitive sports video gaming system in some embodiments.

By way of example, FIG. 4 conceptually illustrates a block diagram 400 of an adaptable competitive sports video gaming system 405. The adaptable competitive sports video gaming system 405 is a physical hardware device that is configured to run video games, such as the reforged adaptable sport video game, the adaptable soccer video game implementation of the reforged adaptable sport video game, other conventional video games, etc.

As shown in this figure, the adaptable competitive sports video gaming system 405 comprises a game play & scoring engine 410, a game play framework 420, a game play rules engine 430, a game event framework 440 comprising a plurality of game event processing units 440A-440C, a reforged game play rules and scoring database 450, an alternate game play rules manager 460, an alternate game play rules database 470, an alternate scoring scenarios database 480, and a user rules and scoring configuration interface 490.

In some embodiments, the game play & scoring engine 410 is configured to provide a game play runtime environment for live playing of the adaptable soccer video game implementation of the reforged adaptable sport video game or another adaptable sport video game implementation of the reforged adaptable sport video game. In some embodiments, the game play framework 420 is communicably connected to the game play & scoring engine 410 and the game event framework 440 to provide runtime notifications of events that are detected by the game event framework 440 during game play. In some embodiments, the plurality of game event processing units 440A-440C of the game event framework 440 comprise a penalty event processing unit 440A, a point event processing unit 440B, and a time and clock event manager 440C.

In some embodiments, the penalty event processing unit 440A detects penalty events for the game event framework 440 as such penalty events occur during game play. In some embodiments, the game event framework 440 loads the reforged game play rules (whether user-specified adapted rules or the reforged rules for the video game) from the reforged game play rules and scoring database 450 and provides the reforged game play rules to the penalty event processing unit 440A at the start of game play. In this way, the penalty event processing unit 440A can quickly detect the issuance of a penalty in realtime during game play and process according to the penalty rules.

In some embodiments, the point event processing unit 440B detects point events for the game event framework 440 as such point events occur during game play. In some embodiments, the game event framework 440 loads the scoring scenarios from the reforged game play rules and scoring database 450 and provides the scoring scenarios to the point event processing unit 440B at the start of game play. In this way, the point event processing unit 440B can quickly identify various scoring scenarios in realtime during game play and tally the score according to the scoring scenario that occurred.

In some embodiments, the time and clock event manager 440C manages the clock countdown and half counter values, as well as clock stop events and half-time break timing for the game event framework 440. In some embodiments, the game event framework 440 loads the reforged game play rules from the reforged game play rules and scoring database 450 and provides the reforged game play rules to the time and clock event manager 440C at the start of game play. In this way, the time and clock event manager 440C can account for game time as configured, as well as manager number of 'halves', 'quarters', or other time periods, break time, stop-clock events, etc., and also manage time if and when overtime periods extend game play, such as in tie games in which players enter a shootout to break the tie.

Additionally, the game play rules engine 430 loads the reforged game play rules from the reforged game play rules and scoring database 450 and maintains a continuous connection with the game play & scoring engine 410 to ensure consistent and seamless playing environment during game play based on the penalty, scoring, and time rules for the reforged adaptable sport video game. Thus, to use the adaptable competitive sports video gaming system and processes of the present disclosure, once the rules are implemented in any type of reforged adaptable sport video game (e.g., an adaptable soccer video game with adapted rules and scoring scenarios), the players will be able enjoy a much more exciting game 'out of the box' (that is, the reforged adaptable sport video game as implemented 'out of the box' for the adaptable competitive sports video gaming system 405). However, the adaptable competitive sports video gaming system 405 does not even limit users to the 'out of the box' adapted rules/scoring scenarios, but also allows for their own custom adaptations to the rules and scoring scenarios for additional variety, as described next.

Specifically, when a user wishes to adapt the reforged game play rules that are implemented for the reforged adaptable sport video game, the user is essentially wishing to further adapt the already adapted version of the sport video game (e.g., the adaptable soccer video with its adapted scoring rules, red card/penalty rules, and adapted time management rules). So, for example, the scoring scenarios presented in FIG. 1 provided five different scoring scenarios for the reforged adaptable sport video game (i.e., one point for getting a corner, two points for when the ball hits the right or left goal post, three points when the ball hits the crossbar, five points if a penalty shot goal is scored, and seven points when a conventional goal is scored). Yet, if the user wishes to further adapt these scoring scenarios, the adaptable competitive sports video gaming system 405 fully supports such user-specified adaptations of the forged adaptable sport video game. Specifically, the adaptable competitive sports video gaming system 405 provides the user rules and scoring configuration interface 490 for this purpose. By interacting with the user rules and scoring configuration interface 490, the user is able to provide his or her own scoring scenarios for game play. Not only can the user provide their own scoring scenarios, but the user can also adapt the game play rules and time management settings through the same user rules and scoring configuration interface 490. When the user provides their own scoring scenarios, game play rules, penalty rules, time management rules, and/or other rules for game play ("user-specified rules"), the user-specified rules are provided to the alternate game play rules manager 460, which persistently stores the user-specified game play rules in the alternate game play rules database 470 and persistently stores the user-specified scoring scenarios in the alternate scoring scenarios database 480. Furthermore, the user-specified scoring scenarios stored in the alternate scoring scenarios database 480 include a link to the user-specified game play rules stored in the alternate game play rules database 470 and vice-a-versa. In this way, all of the user-specified rules can be saved as alternate rules profiles associated with the forged adaptable sport video game and optionally loaded any time in the future when the user plays the forged adaptable sport video game. When loaded in future game play, the game play rules engine 430 would load the user-specified rules and provide these user-specified rules to the game play & scoring engine 410 and the game play framework 420 to use during runtime execution of the reforged adaptable sport video game.

Note, however, that the user is not required to interact with or use the user rules and scoring configuration interface 490 to change/adapt anything (rules, penalties, time, scoring, etc.), but may simply play the reforged adaptable sport video game 'out of the box', which is already an adapted version of a conventional (similar) video game with adapted scoring scenarios, rules, and settings (e.g., adapted soccer video game as an adapted scoring, rules, penalties, etc., of conventional soccer scoring, rules, penalties, etc.).

In this specification, the terms "software", "application", and "video game" are meant to include firmware residing in read-only memory or applications stored in magnetic storage, which can be read into memory for processing by a processor (e.g., of a computing device or a gaming system). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
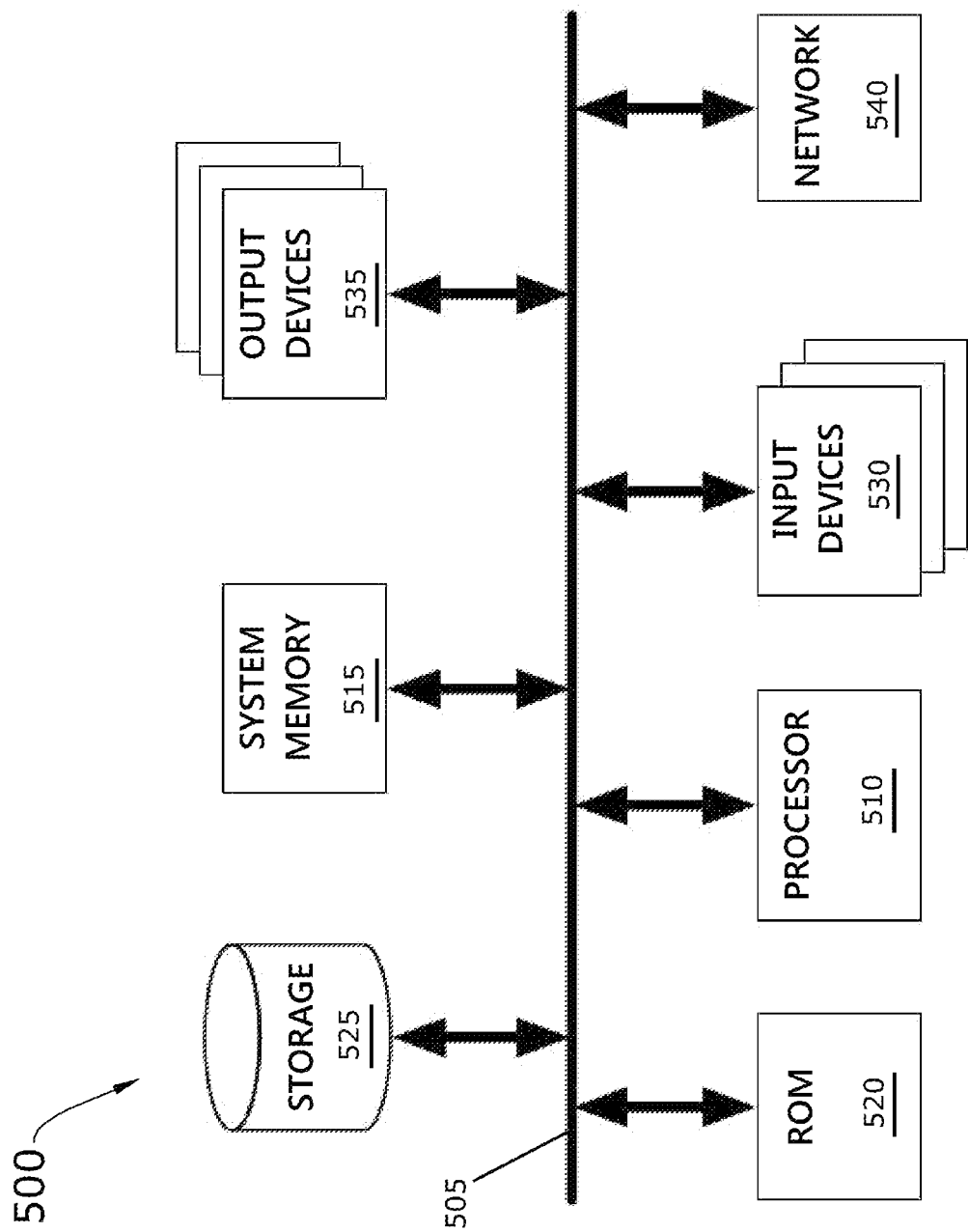
FIG. 5 conceptually illustrates an electronic system with which some embodiments of the invention are implemented.

By way of example, FIG. 5 conceptually illustrates an electronic system 500 with which some embodiments of the invention are implemented. The electronic system 500 may be a mobile device, a smartphone, a tablet computing device, a light screen electronic device, or any other sort of mobile electronic device with a screen. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. For example, the various memory units include instructions for processing game play events and scoring scenarios configured for the reforged adaptable sport video game, such as adapted soccer game play events for an adapted soccer video game based on adapted soccer rules in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display video/imagery generated by the electronic system 500 when during game play of the reforged adaptable sport video game. The output devices 535 include printers and display devices, such as liquid crystal displays (LCD) and organic light emitting diode (OLED) displays. Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. An adaptable competitive sports video gaming system comprising:
   a game play & scoring engine that executes a reforged adaptable sport video game;
   a game play framework that implements game play rules, competitive play components, and a competitive play area upon starting game play;
   a game event framework configured to detect game play events while a game is in play for the reforged adaptable sport video game and trigger an event processing unit to enact one or more game event rules according to the game play rules applied by the game play framework;
   a user rules and scoring configuration interface configured to receive alternate game play rules and alternate scoring scenarios from a user to adapt the game play framework in support of the alternate game play rules;
   an alternate game play rules database configured to store the alternate game play rules;
   an alternate scoring scenarios database configured to store the alternate scoring scenarios provided by the user through the user rules and scoring configuration interface; and
   a game play rules engine configured to detect and process, in realtime during game play, game play events triggered by the event framework in accordance with the runtime game play rules during the game in play.

2. The adaptable competitive sports video gaming system of claim 1, wherein the game event framework comprises a plurality of game event processing units.

3. The adaptable competitive sports video gaming system of claim 2, wherein the plurality of game event processing units comprise a penalty event processing unit.

4. The adaptable competitive sports video gaming system of claim 2, wherein the plurality of game event processing units comprise a point event processing unit.

5. The adaptable competitive sports video gaming system of claim 2, wherein the plurality of game event processing units comprise a time and clock event manager.

6. The adaptable competitive sports video gaming system of claim 1, wherein the game play rules comprise game play scoring rules.

7. The adaptable competitive sports video gaming system of claim 1, wherein the game play rules comprise penalty and substitution rules.

8. The adaptable competitive sports video gaming system of claim 1, wherein the game play rules comprise game play time and clock management rules.

9. The adaptable competitive sports video gaming system of claim 1, wherein the game play & scoring engine is further configured to constrain game play according to the runtime game play rules, competitive play components, and a competitive play area as set in the game play framework.

10. The adaptable competitive sports video gaming system of claim 1, wherein game play & scoring engine is further configured to tally game play scoring for all players based on the scoring rules during game play.

11. The adaptable competitive sports video gaming system of claim 1 further comprising a reforged game play rules and scoring database.

12. The adaptable competitive sports video gaming system of claim 1 further comprising an alternate game play rules manager configured to retrieve the alternate game play rules from the user rules and scoring configuration interface and store the alternate game play rules in the alternate game play rules database.

13. The adaptable competitive sports video gaming system of claim 12, wherein the alternate game play rules manager is further configured to retrieve the alternate scoring scenarios from the user rules and scoring configuration interface and store the alternate scoring scenarios in the alternate scoring scenarios database.

\* \* \* \* \*